(12) United States Patent (10) Patent No.: US 12,687,147 B2
Iyer (45) Date of Patent: Jul. 21, 2026

(54) WAVE ENERGY CONVERSION SYSTEM WITH CAPITULATING BODIES AND NOVEL INSTALLATION

(71) Applicant: Narayan R Iyer, Atlanta, GA (US)

(72) Inventor: Narayan R Iyer, Atlanta, GA (US)

( * ) Notice: Subject to any disclaimer, the term of this patent is extended or adjusted under 35 U.S.C. 154(b) by 0 days.

(21) Appl. No.: 18/670,731

(22) Filed: May 22, 2024

(65) Prior Publication Data

US 2024/0401555 A1 Dec. 5, 2024

Related U.S. Application Data

(60) Provisional application No. 63/583,859, filed on Sep. 19, 2023, provisional application No. 63/514,316, filed on Jul. 18, 2023, provisional application No. 63/512,283, filed on Jul. 6, 2023, provisional application No. 63/491,735, filed on Mar. 22, 2023.

(51) Int. Cl.
*F03B 13/18* (2006.01)
*F03B 13/16* (2006.01)

(52) U.S. Cl.
CPC ............ *F03B 13/187* (2013.01); *F03B 13/16* (2013.01); *F05B 2220/707* (2013.01); *F05B 2240/93* (2013.01); *F05B 2260/502* (2013.01); *F05B 2270/605* (2013.01); *Y02E 10/30* (2013.01)

(58) Field of Classification Search
CPC ........ Y02E 10/30; F03B 13/20; F03B 13/148; F03B 13/187; F03B 13/10; F03B 13/14; F03B 13/1875; F03B 13/16; F03B 13/1865; F03B 13/185; F03B 13/188; F03B 13/1885; F05B 2260/502
See application file for complete search history.

(56) References Cited

U.S. PATENT DOCUMENTS 5,105,094 A * 4/1992 Parker .................. F03B 13/186
290/43
8,105,052 B1 * 1/2012 Hill, Jr. .................. F04B 47/06
60/497

FOREIGN PATENT DOCUMENTS

CN 117450007 A * 1/2024 .............. F03B 13/14
GB 2472625 A * 2/2011 .............. F03B 13/14
(Continued)

OTHER PUBLICATIONS

WO-2011117441-A1, English Language Machine Translation (Year: 2011).*

*Primary Examiner* — Wesley G Harris

(57) ABSTRACT

The invention introduces a wave energy conversion system that utilizes the kinetic energy of water body waves, transforming it into usable energy. The system is innovatively designed with two buoyant bodies that, through their multi-dimensional non-parallel arrangement, form a recess optimized for capturing wave energy from. One of the system's distinctive features is its capacity to passively modify the relative orientation of the buoyant bodies, to become more parallel, in response to large wave forces, which serves to maintain stability under varying sea conditions. Concurrently, the system boasts advancements in the realm of installation and maintenance, presenting a streamlined approach that significantly alleviates the challenges traditionally associated with deploying and upkeeping marine energy converters. These aspects together underscore the system's novel contributions to enhancing the operational efficiency and sustainability of wave energy conversion technology.

18 Claims, 17 Drawing Sheets

(56) References Cited

FOREIGN PATENT DOCUMENTS

| | | | | | |
|---|---|---|---|---|---|
| GB | 2512627 | A | * | 10/2014 | ............ F03B 13/182 |
| KR | 20130034644 | A | * | 4/2013 | ............. F03B 13/16 |
| WO | WO-9600848 | A1 | * | 1/1996 | ............ F03B 13/144 |
| WO | WO-2006058421 | A1 | * | 6/2006 | ............. F03B 13/14 |
| WO | WO-2006123796 | A1 | * | 11/2006 | ............. F03B 13/10 |
| WO | WO-2009140689 | A2 | * | 11/2009 | ............ A01K 61/00 |
| WO | WO-2011117441 | A1 | * | 9/2011 | ......... F03B 13/1885 |
| WO | WO-2013077752 | A1 | * | 5/2013 | ............. F03D 3/02 |

* cited by examiner

WAVE ENERGY CONVERSION SYSTEM WITH CAPITULATING BODIES AND NOVEL INSTALLATION

CROSS-REFERENCE TO RELATED APPLICATIONS

This application claims priority to and benefits from U.S. Provisional Patent Application Nos. 63/491,735 filed on Mar. 22, 2023, 63/512,283 filed on Jul. 6, 2023, 63/514,316 filed on Jul. 18, 2023, and 63/583,859 filed on Sep. 19, 2023. These provisional applications are incorporated herein by reference in their entirety.

BACKGROUND OF THE INVENTION

The push for renewable energy sources is a critical endeavor in the quest for environmental sustainability and the diversification of energy supply. Ocean wave energy, with its immense potential, remains largely underexploited due to existing technological and operational hurdles. Key among these are the efficiency of energy capture, survival in extreme conditions and the practical challenges of system installation and maintenance in marine settings. Traditional wave energy converters often grapple with these issues, limiting their effectiveness and broader adoption.

This invention presents a wave energy conversion system that addresses these challenges head-on. The present invention is focused on nearshore conditions where a more unidirectional wave field is present, and provides an extension of the idea for a more multidirectional wave field. The invention involves configuring two buoyant bodies, shaped like wings to create a recess, which optimizes the capture of wave energy. In extreme conditions, these wing-like buoyant bodies move relative to each other to allow the recess to at least partially capitulate to the oncoming wave. This configuration is important, not only for its efficiency in energy capture but also for its adaptability to large wave forces, ensuring system resilience. Moreover, the invention simplifies the installation and maintenance process, a critical advancement that significantly reduces the logistical and financial barriers associated with marine energy projects. Another innovation is the crisscrossing configuration of linear generators, which is configured in between the two wings. The criss-crossing linear generators allow for the capture of horizontal and vertical components of the wave energy system's motion that is in response to waves, leading to greater energy efficiency.

BRIEF DESCRIPTION OF THE DRAWINGS

Various embodiments of the invention are disclosed in the following detailed description and accompanying drawings.

FIG. 1 is a perspective view of one embodiment of the present invention, showing the first and second buoyant bodies forming a recess toward the direction of the wave field, designed to capture on coming waves, and includes depiction of cylinders as a power-takeoff mechanism.

FIG. 2 provides a side view of the embodiment of the present invention shown in FIG. 1, illustrating its configuration without the mooring lines visible.

FIG. 3 is a front top view of the present invention system in normal operating mode, showcasing the effective recess formed by the buoyant bodies and a stopper 108*b* at the rear of the recess for partial physical closure, enhancing the system's energy capture efficiency.

FIG. 4 depicts the MantaWave under extreme wave conditions, illustrating how the gap between the two buoyant bodies at the rear of the recess widens, allowing for pressure relief and survival from extreme force conditions through capitulation of the recess to the oncoming wave.

The figures collectively showcase the innovative design and operational mechanisms of the present invention for converting kinetic energy from water body waves to usable energy. The detailed views provide insight into both the system's design for efficiency in energy capture and its resilience under varying sea conditions.

SUMMARY OF THE INVENTION

Figure 3:
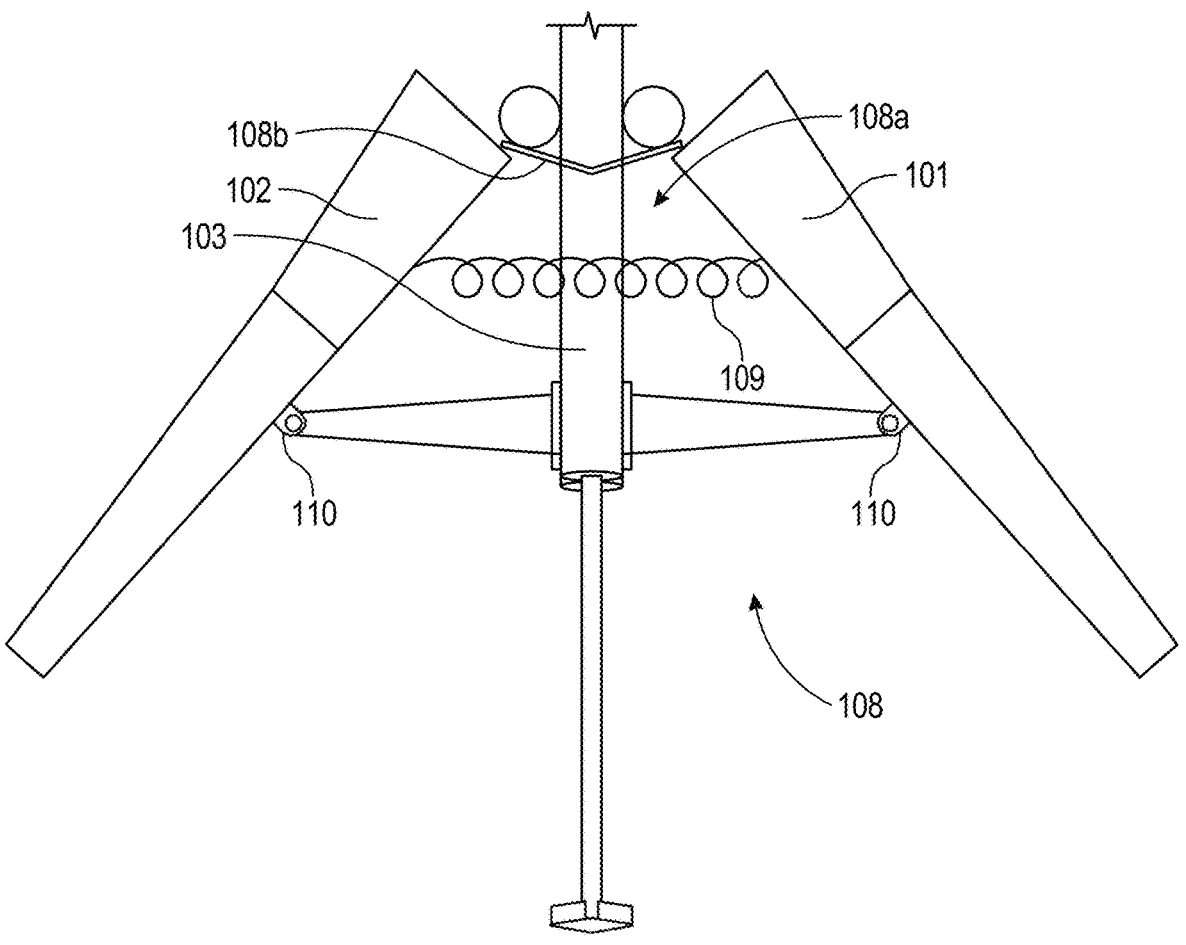
Figure 4:
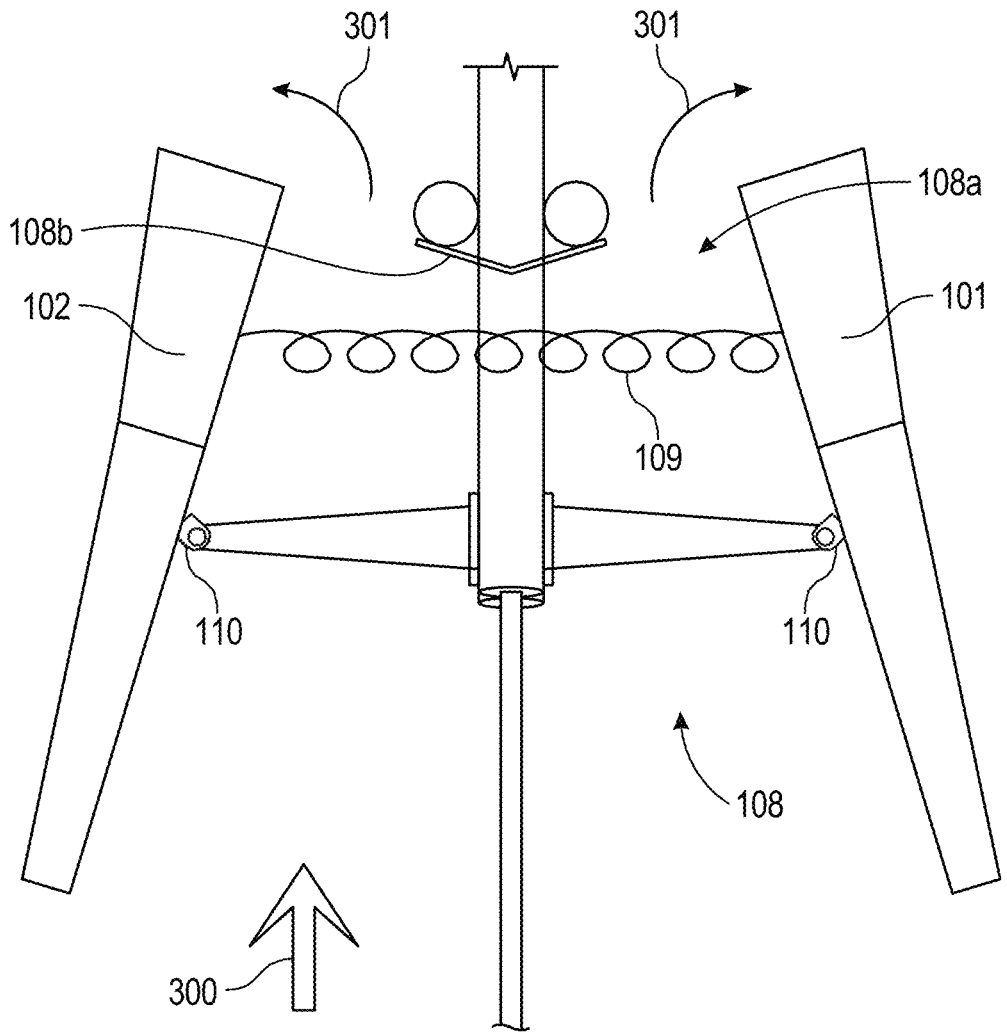

The present invention describes a system for converting kinetic energy from water body waves to usable energy, the system comprising:

a first buoyant body (101);

a second buoyant body (102);

wherein at least the first buoyant body and the second buoyant body in combination form a recess (108);

wherein at least one of said first buoyant body and the second buoyant body is configured to harness kinetic energy from water waves;

wherein a characteristic plane of the first buoyant body and a characteristic plane of the second buoyant body are substantially non-parallel to each other when a force of a water wave does not exceed a threshold value (FIG. 3); and wherein when the force, from a wave, imparted onto the system exceeds said threshold value, the first buoyant body (101) and the second buoyant body (102) move relative to each other such that the characteristic plane of the first buoyant body and the characteristic plane of the second buoyant body become substantially closer to parallel with each other (FIG. 4).

In addition, the present invention describes a method for converting kinetic energy from water body waves to usable energy, the method comprising the steps of:

providing a first buoyant body;

providing a second buoyant body;

wherein at least the first buoyant body and the second buoyant body in combination form a recess;

wherein at least one of said first buoyant body and the second buoyant body is configured to harness kinetic energy from water waves;

wherein a characteristic plane of the first buoyant body and a characteristic plane of the second buoyant body are substantially non-parallel to each other when a force, from a water wave, imparted onto the system does not exceed a threshold value; and, wherein when the force, from a wave, imparted onto the system exceeds said threshold value, the first buoyant body and the second buoyant body move relative to each other such that the characteristic plane of the first buoyant body and the characteristic plane of the second buoyant body become substantially closer to parallel with each other.

Some of the intended objects and advantages of the present invention are stated below:

It is an object of this invention to provide two wave responsive bodies coupled to each other that can capitulate to extreme wave forces while not capitulating to normal wave forces.

It is an advantage of this invention to allow effective wave energy conversion during normal conditions but reduce drag coefficient during extreme wave forces.

It is an object of this invention to recover from a capitulation state after an extreme wave condition subsides.

It is an advantage of this invention to recover from an extreme condition and reconfigure to a normal state.

It is an object of the present invention to capture horizontal and vertical motion of the wave energy system in response to wave motion using crisscrossing power take off cylinders.

DETAILS OF THE INVENTION

Figure 1:
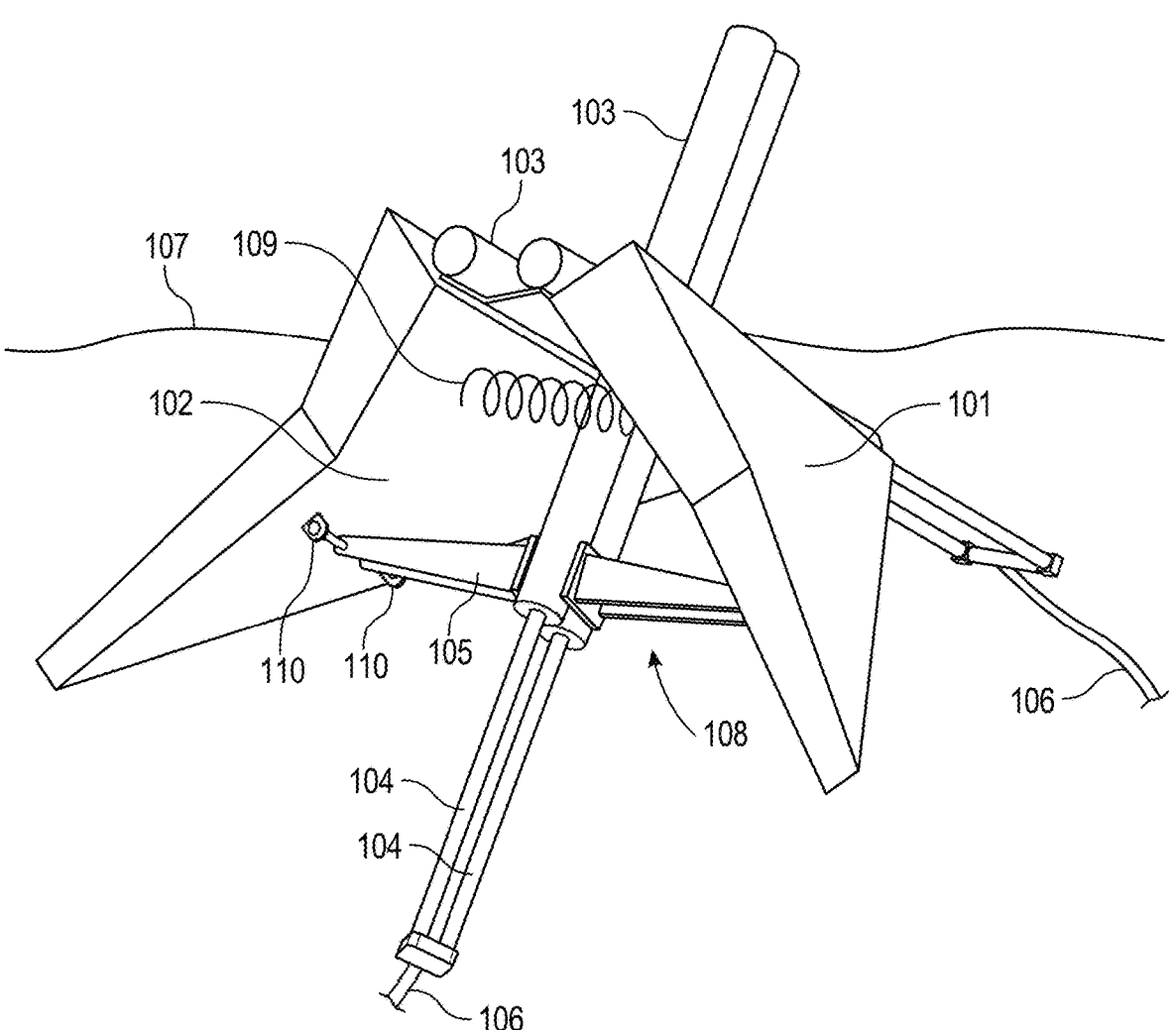
FIG. 1 through 4 in particular generally depict a system that I have named the "MantaWave", and said name is not intended to comprise a meaning that would affect the system functionality.

Referring to FIG. 1, one embodiment of the present invention is shown from a perspective view. In some embodiments, the first buoyant body 101 and the second buoyant body 102 in combination form a recess 108 that faces and captures the oncoming waves. The first and second buoyant bodies 101 and 102 can be collectively referred to as the "wings". A physical recess of a body increases the body's coefficient of drag and therefore allows for greater force capture. In some embodiments the wave energy converter comprises cylinders 103, with said cylinders further comprising at least one of a spring and a generator, which in turn can be any of a linear generator (preferred) and a rotary generator. In some embodiments, the cylinder 103 comprises a piston (magnetic piston for a linear generator) and piston rod 104 that is operatively connected to a mooring line 106. In the preferred embodiments when a wave of nominal strength hits the wave energy converter, the first and second buoyant bodies 101 and 102 do not substantially move relative to each other, instead the first and second buoyant bodies, 101 and 102, capture kinetic energy of said wave and move to toward the rear of the wave energy converter. When this happens, the wings 101 and 102 pull the cylinders 103 with them, but since the piston rod 104 is moored to a high inertia underwater body (such as a submerged part of earth), the cylinder 103 will effectively move relative to the piston rod 104. This relative motion can be harnessed and converted into usable energy. When the wave subsides however, a restorative method needs to bring the piston rod 104 back to its equilibrium position relative to the cylinder 103. Said restorative method, in some embodiments, is an extension spring that connects the cylinder 103 (internally) with the piston rod 104 (FIG. 4 shows this connection). In summary, when a wave hits the wings, the wings and cylinder are perturbed from an equilibrium position, and springs within the cylinders get energized, and when the wave subsides, the springs releases the energy to bring the buoy back to an equilibrium state. The water line is represented by 107.

In other embodiments, the cylinder 103 is a pump that pumps pressurized water to a turbine, and said turbine is operatively coupled to a rotary generator. The first buoyant body may also be referred to as the left wing and the second buoyant body as the right wing.

In the preferred embodiment, the cylinders 103 criss-cross each other allowing absorption of energy from surge and heave directions because horizontal and vertical motion of the wave energy converter will have components of both said motions imparting force onto the cylinders via the piston rods 104.

Still referring to FIG. 1, In some embodiments, a connection member 105, at least in part, connects the first buoyant body 101 with the second buoyant body 102, wherein said connections occur at pivots 110. This allows the bodies to rotate about said pivots but substantially not translate along said pivots. Pivots are more visible on FIG. 3.

FIG. 1 shows an embodiment where the first buoyant body and the second buoyant body comprise an upper portion that is fatter than the lower portion of said bodies. This allows for floating stability. In some embodiments, the base of the first buoyant body is greater than the base of the second buoyant body. In some embodiments, any of the first buoyant body and the second buoyant body comprise a buoyancy force that is equal to or greater than its weight when said body is submerged in water. In some embodiments, the characteristic planes of the first buoyant body and/or second buoyant body are neither substantially parallel to an imaginary horizontal plane (tangent to nearest earth) nor substantially perpendicular to said horizontal plane.

In some embodiments, when a wave of extreme force hits the system, the first 101 and second 102 buoyant bodies substantially rotate and/or move relative to each other extending the capitulation spring 109 (this is meant to be different from the cylinder spring that is not shown). This allows the recess to develop a gap in the rear of the system, allowing for substantial partial capitulation to occur. This allows pressure relief and survival from extreme force conditions. In essence, if a force exceeds a certain threshold, water is allowed to escape. In some embodiments, the extent of said relative rotation depends upon the force of the wave. In some embodiments, the extent of capitulation depends upon the force of the wave.

It is important to understand that, in the preferred embodiment, the first buoyant body and second buoyant body may move in small amounts when non-excessive wave forces occur. This is not to be considered substantial capitulation, especially when a stopper is provided (FIG. 3, 108b).

Figure 2:
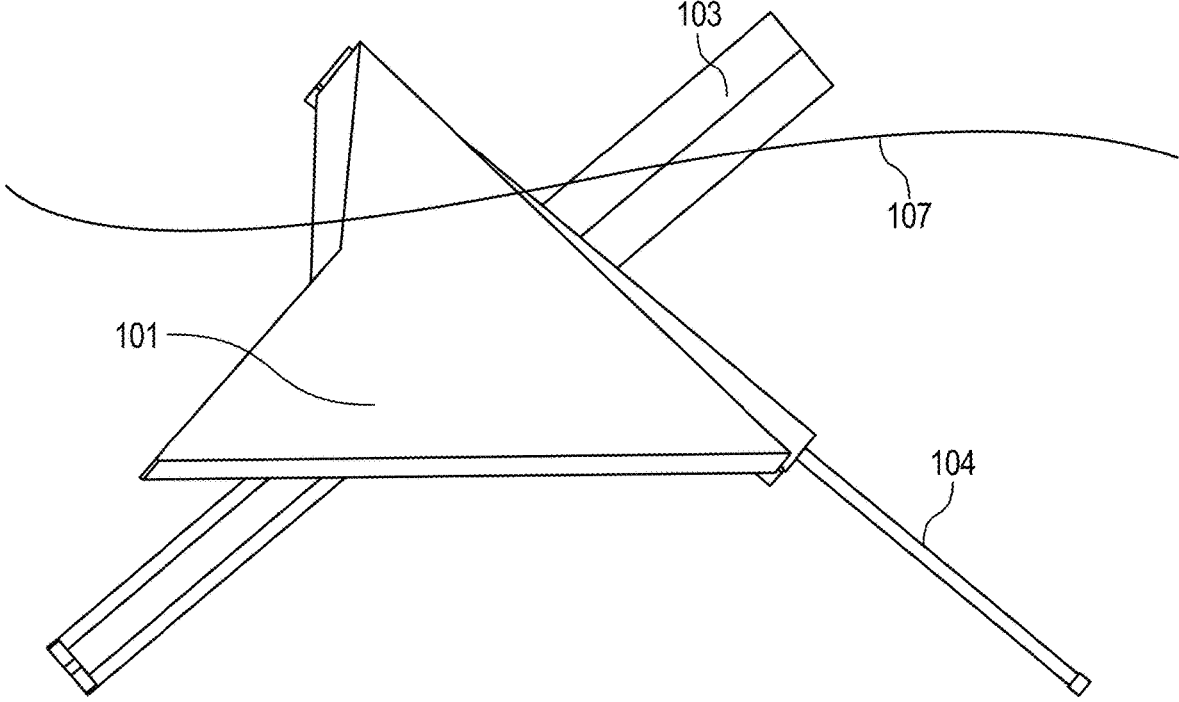

Referring to FIG. 2, a side view of the present invention is shown without mooring lines visible. In some embodiments, the cylinders 103 are able to swivel relative to the first buoyant body and the second buoyant body; this allows conversion of wave motion to usable work along a larger spectrum of force components. The cylinders 103 in preferred embodiments comprise a power takeoff system. In some embodiments, the cylinders 103 swivel relative to each other. A "forward cylinder" 103 is one that has a rod 104 exiting the cylinder toward the front of the wave energy converter, and a "backward cylinder" 103 is one that has a rod 104 exiting the cylinder toward the back of the wave energy converter. In a preferred embodiment, forward cylinders 103 are able to swivel relative to backward cylinders 103. In some embodiments, multiple forward cylinders are restricted from swiveling relative to each other, while being allowed to rotate relative to the backward cylinders. In some embodiments, multiple backward cylinders are restricted from swiveling relative to each other while being able to rotate relative to the forward cylinders.

In some embodiments, the power takeoff system is at least one of a desalination system, a linear generator, a pump to pressurize water to effectively drive a turbine, a pump to produce pressurized fluid for other use cases, and at least part of a uranium-capturing filtration system. In some embodiments, the cylinders comprise linear generators, and the electricity from said linear generators is used to electrolyze water to produce hydrogen. In some embodiments, instead of cylindrical linear generators 103, rotary generators are provided in the wave energy system.

Referring to FIG. 3, a front top view of the present invention is shown of a preferred embodiment in normal operating mode. In this embodiment, the effective recess 108 is shown, this recess is in part formed by the buoyant bodies 101 and 102. In addition, a stopper 108b is provided at the rear of the recess 108a. The stopper 108b allows at least partial physical closure of the gap that occurs between the first buoyant body 101 and the second buoyant body 102 at the rear of the recess 108a. In some embodiments, in normal conditions, the stopper 108b allows for substantial closure of the rear of the recess 108a. The gap between the first buoyant body and second buoyant body at the rear of the recess 108a during calm water conditions can be referred to as an "inert gap". Calm water is a scenario that has no waves and/or negligible waves.

In some embodiments, the stopper extends beyond the inert gap of two buoyant bodies so as to account for small rotary movements between the first and second buoyant bodies 101 and 102 relative to each other that may occur during normal conditions, and keep substantial closure of the recess intact during these small movements. These small movements are not substantial capitulation of the device.

Now referring to FIG. 4, a front top view is shown of the present invention's preferred embodiment for an extreme condition, wherein an extreme wave force 300 is encountered. When a certain wave force threshold is exceeded, the gap between the two bodies 101 and 102 at the rear of the recess 108a widens substantially beyond the stopper's 108b edges, extending spring 109, which in some embodiments, allows for substantial un-closure of the recess 108. This substantial capitulation of the recess allows for a substantial volume of water to escape 301 thus reducing the wave-induced pressure on the buoyant bodies 101 and 102. The widening of the gap between the two bodies 101 and 102 at the rear of the recess 108a is due to said large wave force causing the bodies 101 and 102 to rotate about their corresponding pivot 110 and become more parallel to each other compared to a normal operating condition shown in FIG. 3. Referring back to FIG. 4, once the large wave force subsides after capitulation, the extended spring 109 then pulls the two bodies 101 and 102 together, returning back to the normal operating mode seen in FIG. 3.

Figure 5:
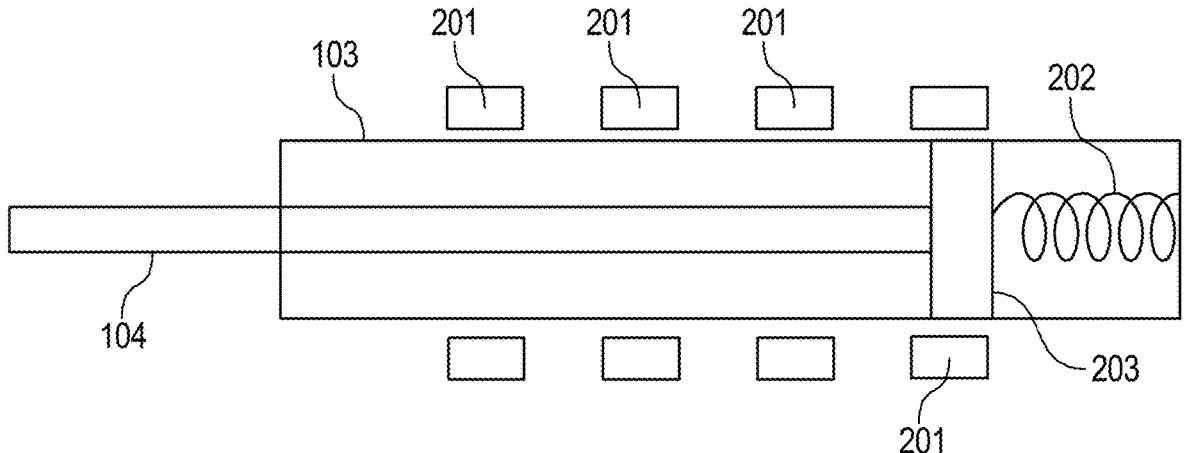
FIG. 5 shows a cross-sectional view of a single cylinder within the MantaWave, detailing the mechanism by which kinetic energy is converted into electricity through the movement of a piston head relative to coils, with a spring mechanism for restoring equilibrium.

FIG. 5 shows one embodiment of a single cylinder 103 in cross sectional view. When a wave hits the system, the cylinder is moved due to its effective connection to the buoyant bodies 101 and 102. When the cylinder moves relative to the piston rod 104, the piston head 203 moves relative to said cylinder. In some embodiments, the piston head 104 comprises one or more magnets, and the movement of said piston head 104 relative to coils 201 produces electricity. The spring 202 is a restorative mechanism that serves to pull the wave energy converter (WEC) back to an equilibrium state once a wave force subsides (this spring is not to be confused with 109, which is only used for extreme conditions). In some embodiments, the spring 202 is at least one of a magnetic, hydraulic, mechanical and pneumatic spring. In some embodiments, instead of a linear generator, the cylinder 103 pressurizes water for use in desalination.

Figure 6:
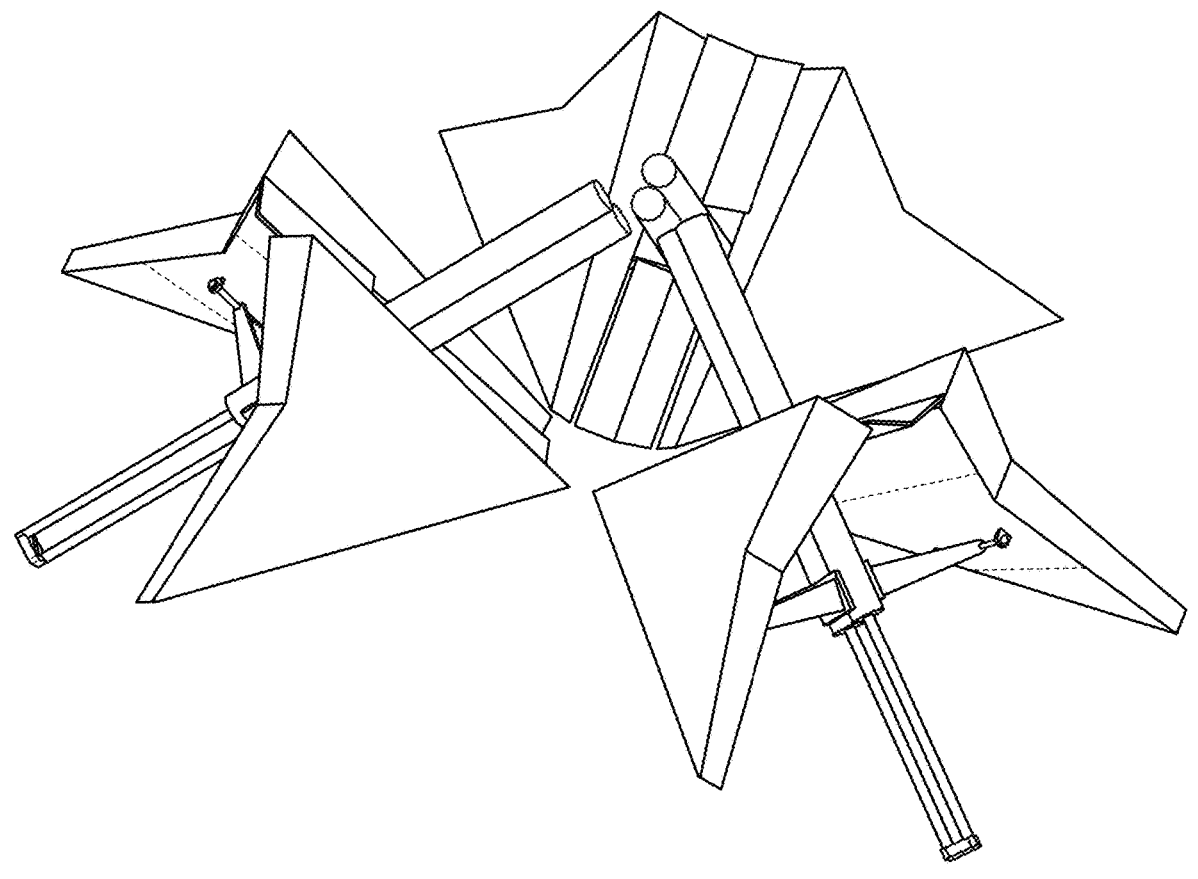
FIG. 6 illustrates a configuration of multiple units connected with each other to form a larger wave energy conversion system, demonstrating how the system can be scaled and arranged to capture energy from various directions of waves, enhancing the total energy capture capability of the device.

Now referring to FIG. 6, In some embodiments, multiple MantaWaves can be connected with each other to form a larger system that captures energy from different directions of waves. In some embodiments, this arrangement can be done in a concentric manner.

In some embodiments, a body's characteristic plane is a plane of best fit that optimally aligns with the points that define the body's geometry, in some embodiments, said points being vertices where edges meet. This term is used to define the bodies of this wave energy converter. In some embodiments, normal operational mode is defined by the wave energy converter installed and functional in converting energy during normal and/or calm sea conditions. In some embodiments, "usable energy" can be at least one of by electricity, high pressure water for desalination, high pressure water stream for desalination, pressurized gasses for chemical reactions, high pressure water stream for storage at high altitudes for later use.

Figure 7:
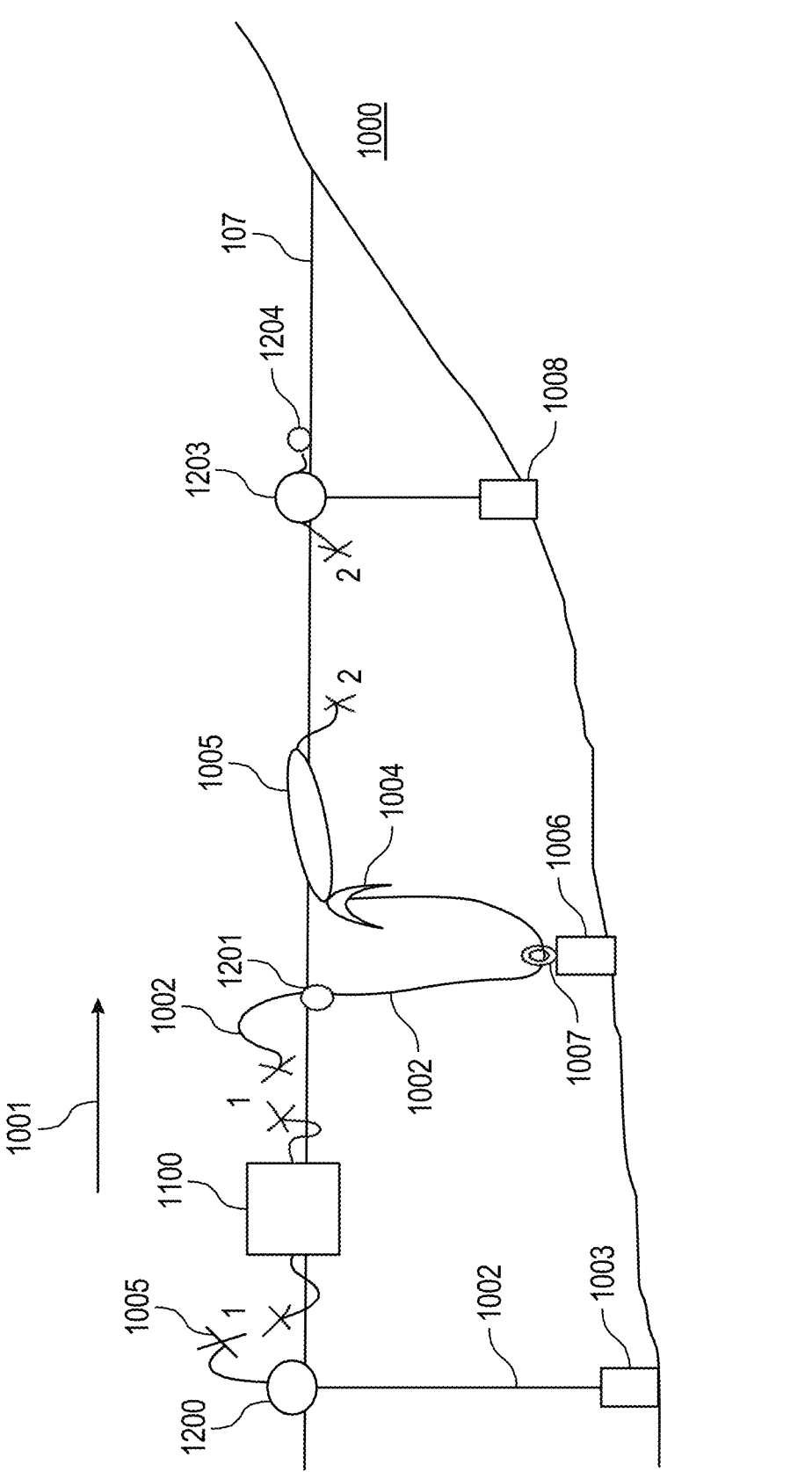
FIG. 7.
Figure 8:
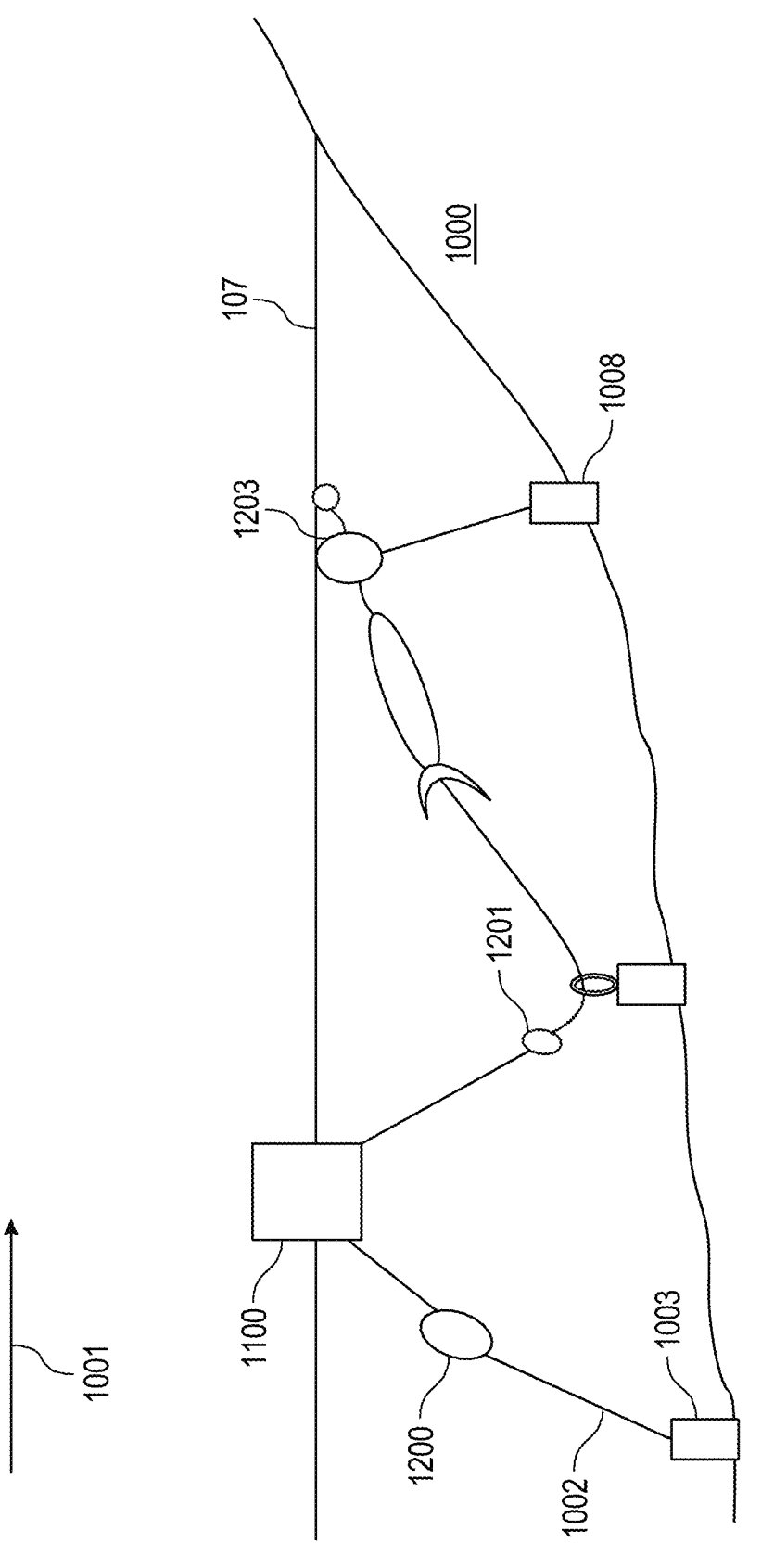
FIG. 8 describe the installation method of the MantaWave Wave Energy Converter (WEC), with FIG. 7 showing the system before tensioning and FIG. 8 showing the system after tensioning. These figures highlight the innovative mooring and tensioning system designed for optimal power capture and ease of installation and maintenance.

This invention also discusses the installation method of the MantaWave WEC. FIG. 7 and FIG. 8 describe a method to install a wave energy converter. Referring to FIG. 7, the wave energy converter 1100 is brought to the vicinity of the first marker buoy 1200 and a second marker buoy 1201.

The first marker buoy is connected with an anchor 1003 using a flexible link such as a rope and/or mooring line 1002. The second marker buoy 1201 is connected with a mooring line that goes through a loop 1007, wherein said mooring line then connects with an optional drogue. 1004. In some embodiments, the loop is a hole in an anchor itself. In some embodiments, the loop is shaped like a wormhole. In some embodiments, the loop 1007 is connected with an anchor 1006. The optional drogue is operationally connected with an optional oblong buoy 1005. There is also provided a third marker buoy 1203 and a smaller locator buoy 1204 connected with a corresponding anchor 1008. The water line is labeled 107, and in some embodiments, the general expected wave direction is labeled 1001. Land is labeled 1000.

The installation steps are as follows:

1. Connect the WEC 1100 with the 1st and 2nd marker buoys, by establishing the first set of connections 1.
2. Pull the Onblong buoy and connect it to the 3rd marker buoy by establishing the second set of connections 2, causing tensioning.

FIG. 8 now shows the tensioned state. Tensioning allows the WEC interfacing mooring to become diagonal and optimal in power capture. FIG. 7 nor FIG. 8 show any electrical cable. In some embodiments, an electrical cable is provided.

Uninstallation: simply disconnect the 3rd marker buoy from the Oblong buoy, and the mooring should start to un-tension, and the 1st and 2nd marker buoys will rise to the surface automatically. Next disconnect the WEC from the 1st and 2nd marker buoys. Now one can easily remove the device to carry out maintenance. This mooring method allows for easy surface level installation, easy removal for maintenance, especially conducive to temporary bases, disaster relief and/or R&D. Tension is expected to be maintained at all tides with this system. The connections can be facilitated via a vessel and an operator.

Figure 9:
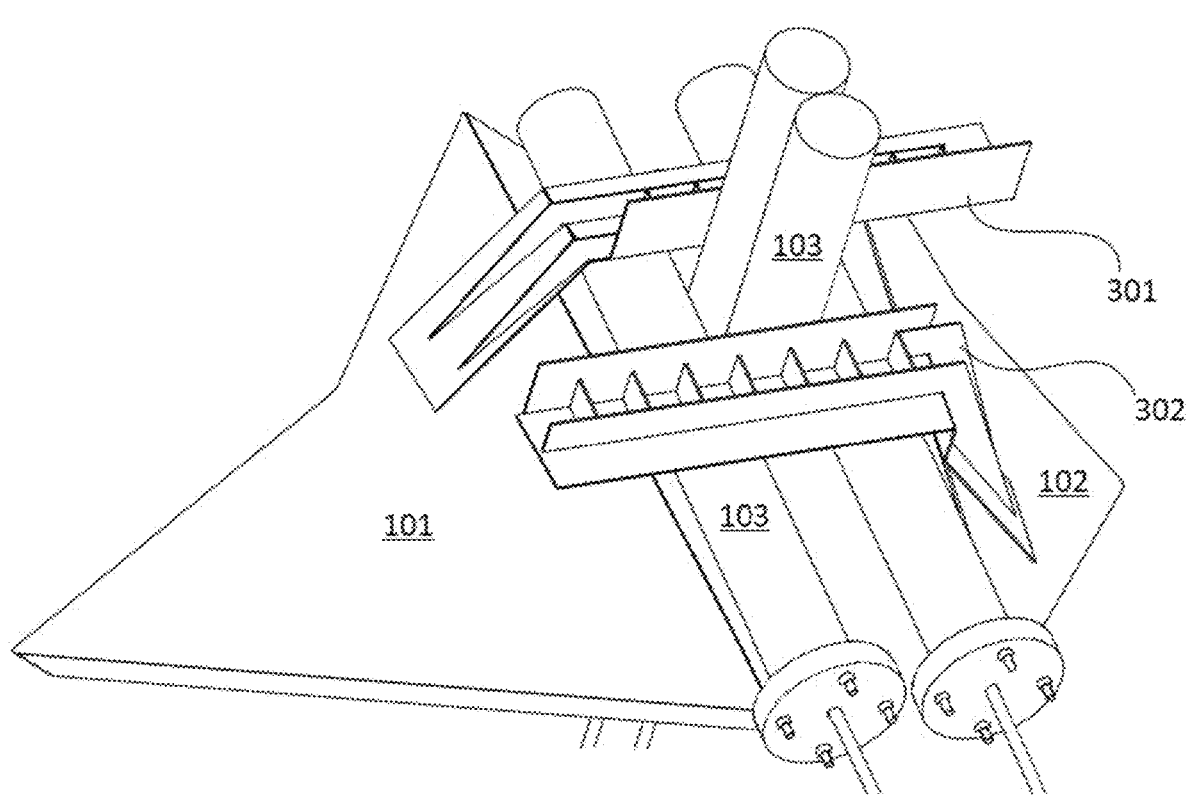
FIG. 9 shows the back left perspective view of the present invention wherein braces 301 and 302 are shown. The braces add support to the linear generators while being rigidly attached to their corresponding wing. The braces allow for the enforcement of only one substantial degree of freedom for the capitulation mechanism during extreme conditions.

FIG. 9 shows the back left perspective view of the present invention wherein braces 301 and 302 are shown. The braces add support to the linear generators while being rigidly attached to their corresponding wing. The front brace 301 in the shown embodiment is rigidly attached with the left wing 101, whereas the back brace is rigidly attached with the right wing 102. The support occurs while having a sliding, non-rigid contact with the cylinders.

Figure 10:
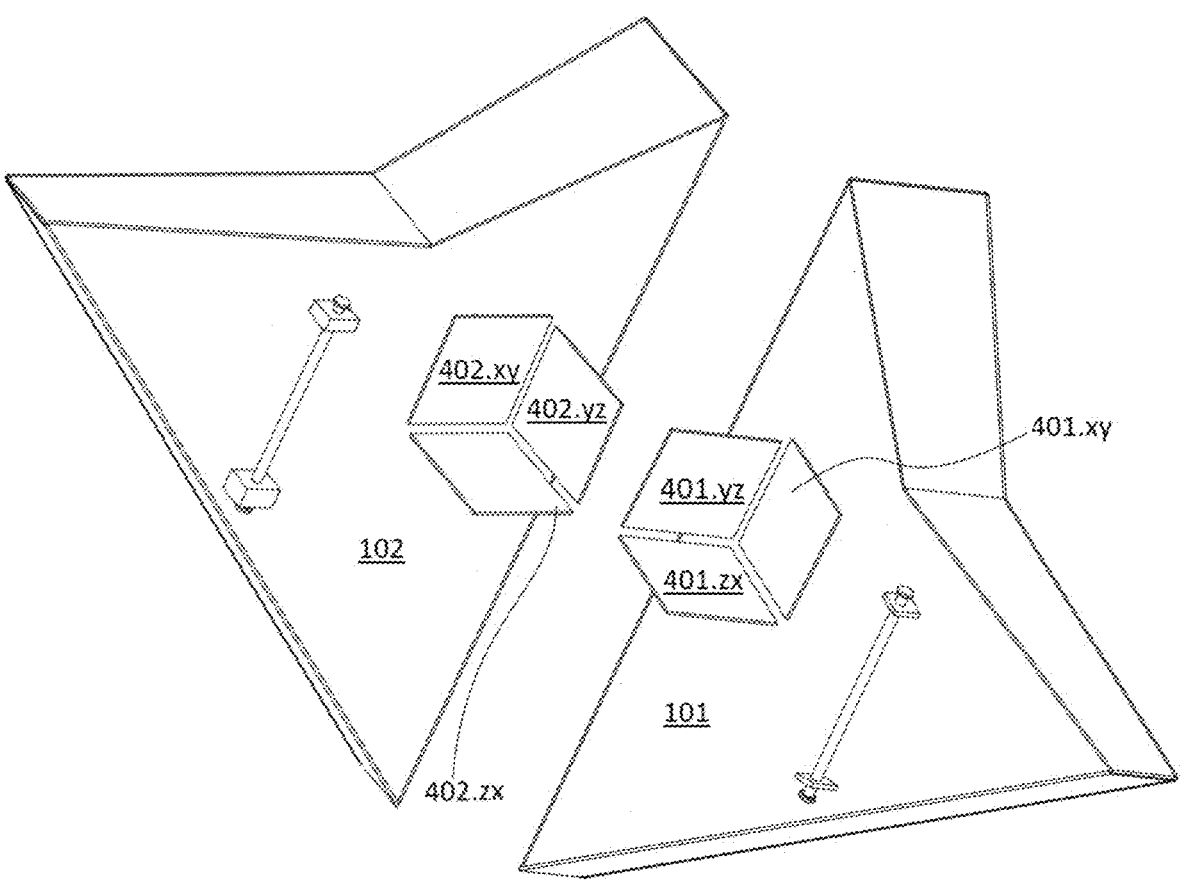
FIG. 10 shows a bottom perspective view of the present invention with fundamental planes. 401.*xy*, 401.*yz*, 401.*zx*, 402.*xy*, 402.*yz*, 402.*zx*; these are imaginary planes.

FIG. 10 shows a bottom perspective view of the present invention with fundamental planes shown 401.*xy*, 401.*yz*, 401.*zx*, 402.*xy*, 402.*yz*, 402.*zx*; these are imaginary planes. In some embodiments, the three fundamental planes of a body are all perpendicular to each other and one of said planes is parallel and/or coplanar with the characteristic plane of said body.

Looking at FIG. 10, if the first buoyant body 101 and second buoyant body 102 were completely parallel to each other (their characteristic planes being parallel to each other), each fundamental plane of the first buoyant body 401.*xy*, 401.*yz* and 401.*zx* will intersect the fundamental planes of the second buoyant body to create two distinct lines if all planes were extended infinitely. For instance, if the first and second buoyant bodies (left and right wings) were substantially parallel, such that their corresponding characteristic planes were parallel to each other, plane 401.*yz* will intersect with 402.*zx* and 402.*xy* to form two distinct lines, but it will not intersect 402.*yz* on a line (since they're parallel and/or coplanar), similarly 401.*xy* and 401.*zx* will form two distinct lines with the fundamental planes of the second buoyant body 102. Now if the first buoyant body and second buoyant body were non-parallel in one dimension (simple tilt with respect to each other), only one fundamental plane of the first buoyant body will form two lines with the fundamental planes of the second buoyant body, all other fundamental planes of the first buoyant body will form three lines with the fundamental planes of the second buoyant body if all planes were extended infinitely. Now, for the preferred embodiment, the first buoyant body and the second buoyant body are non-parallel to each other in multiple dimensions (tilts in two dimensions: two simple tilts with respect to each other), and this causes each of the three fundamental planes of the first buoyant body to form three distinct intersection lines with the fundamental planes of the second buoyant body. This will allow for a multidimensional recess to be formed by the two bodies, which improves heave (vertical wave force component) and surge (horizontal wave force component) capture.

Figure 11:
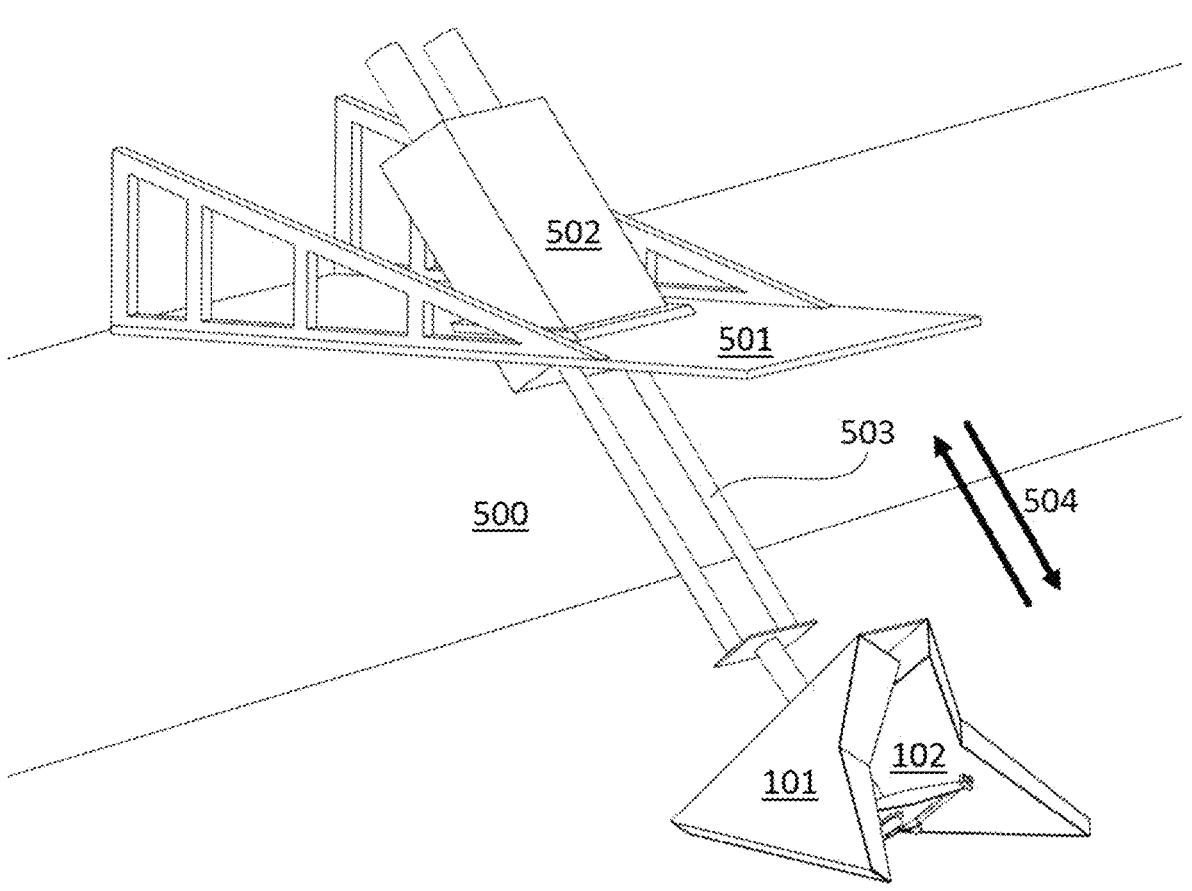
FIG. 11 displays front right perspective view of an embodiment of the MantaWave device that is configured to a platform such as a barge, pier, jetty, a wave diminishing device and/or another platform, and with the power takeoff attached with said platform.

Now referring to FIG. 11, in some embodiments, the MantaWave wings 101 and 102, are coupled to a power takeoff system 502, at least in part, via rods 503. In some embodiment, the power take-off system 502 is any of a desalination system, a system of linear generators and rotary generators. In some embodiments, the power takeoff system 502 is attached with any of a barge, dock, pier, wave diminishing device and another body of significantly higher inertia than the wave energy converter's wave-responsive body 500. The high inertia body 500 can be broadly categorized as a "platform". The wings are buoyant and capture wave motion and moves 504 relative to the platform 500. The power takeoff system 502 converts this motion to usable energy. In some embodiments, the buoyancy of the wings can be adjusted by filling the hollow wing bodies with water and/or removing water from these bodies. Instead of the wings 101 and 102, in some embodiments, a buoy is affixed to the rod 503, and in some embodiments, said buoy comprises a recess that faces down toward earth. Said downward recess provides suction forces when a wave trough is encountered.

In some embodiments, there could be two conjoined MantaWave wings back-to-back 150 and 151. These are attached to rods 104 which, in some embodiments, are connected to cylinders 103 which hold pistons. This cylinder system 103 is then rigidly connected with the barge or dock platform in some embodiments. The MantaWaves motion due to the waves is translated through the attached rods as linear motion which pushes the pistons attached to the rods. This barge/dock concept can be extended further to other wave-capture shapes besides the MantaWave.

Figure 12:
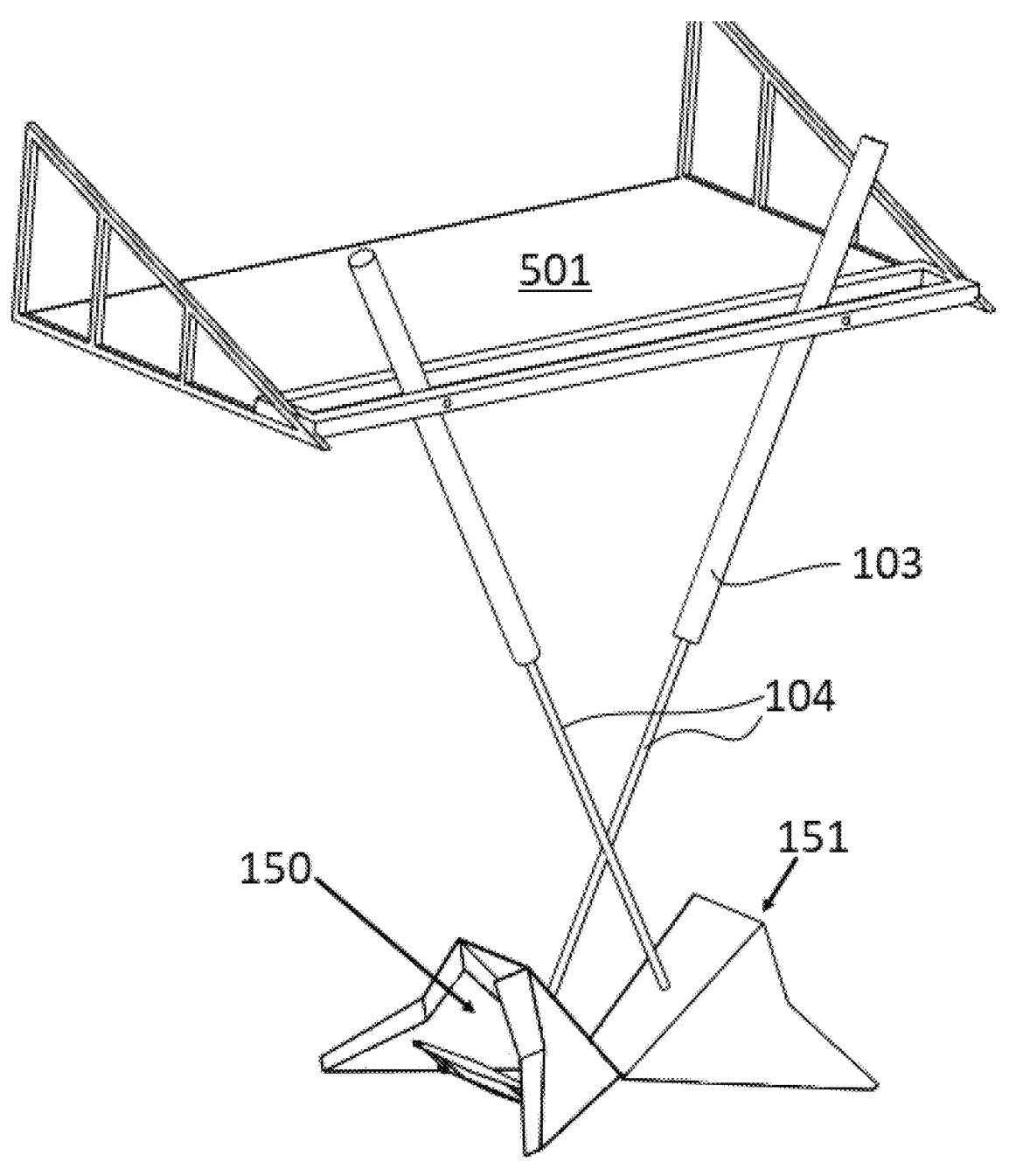
FIG. 12 shows a front right perspective view embodiment of a platform based MantaWave device with pivoting power takeoff cylinders, wherein the cylinders can move with a single degree of freedom with respect to the platform and with two pairs of wings facing different directions.
Figure 13:
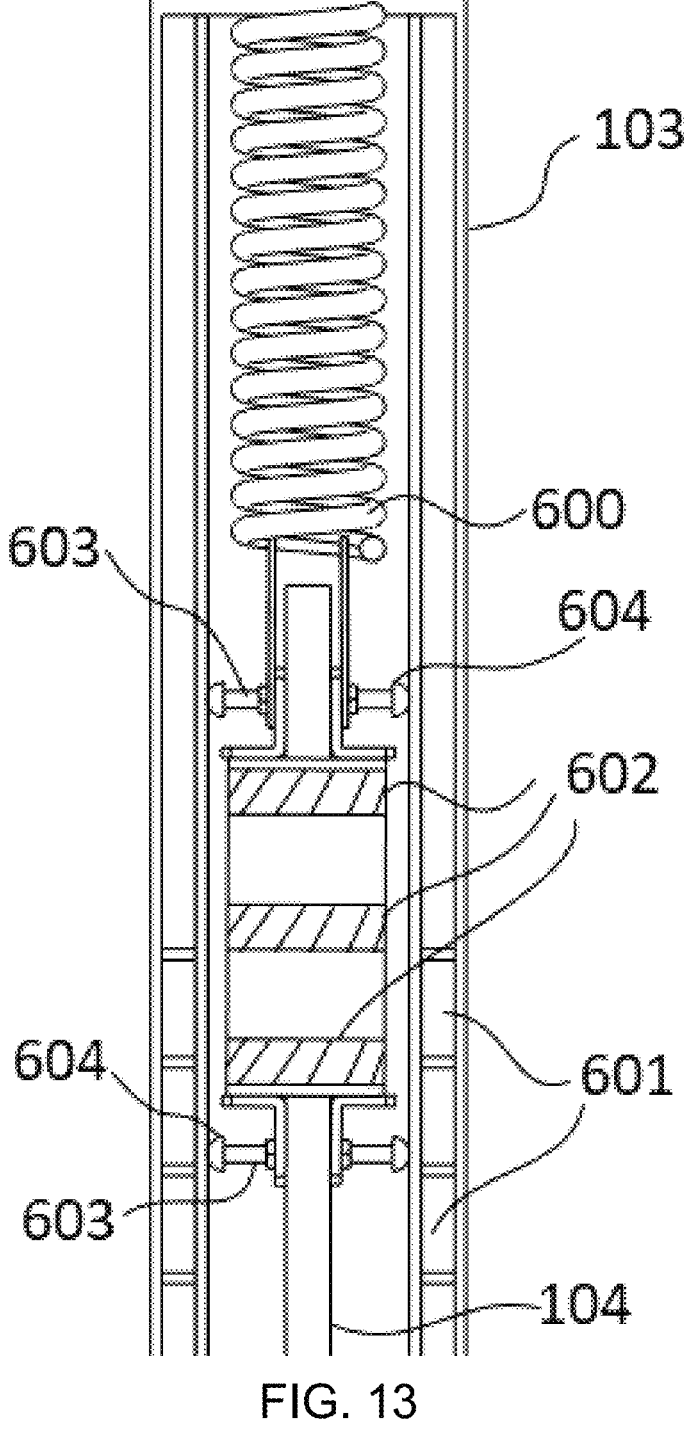
FIG. 13 shows cross-sectional view of an embodiment of the cylinder from the embodiments of the previous figures, wherein linear generator functionality as well as friction reducing components are introduced.

Now referring to FIG. 13, one embodiment of a cylinder 103 is shown from the previous embodiments within FIG. 1-6, FIG. 9, FIG. 11 and/or FIG. 12. FIG. 13 shows a cross-sectional view of an embodiment wherein a piston rod 104 comprises holes wherein smaller rods 603 goes through said piston rod 104. In some embodiments, the purpose of the rod 603 is to allow for the securing of other components to said piston rod. In a preferred embodiment, the rod 603 is a threaded rod. In the linear generator embodiment, the rod 603, at least in part, contributes to the securing of the magnets 602 and magnet separators. In some embodiments, at least one end of the rod 603 comprises a rounded cap 604, and in a preferred embodiment, the rounded cap 604 is a cap nut that is screwed onto the rod 603 (threaded). The rounded cap allows for the reduction of friction between the cylinder inner wall 103 and the piston system. The spring 600 connects the cylinder end to the end of the piston system, this spring mechanism has the same functionality as FIG. 5

US 12,687,147 B2

9

202. The pockets 601 can comprise coils for the generation of electricity as the magnetic piston moves back and forth within the cylinder 203.

Looking at FIG. 13 in combination with FIG. 1, one embodiment of the cylinder 203 configures said cylinder to be open on one end. Specifically, the cylinder 103 is open on the end where the piston rod 104 exits said cylinder 103. This would allow some water to enter the cylinder. The opening reduces complexity with respect to the need for components such as dynamic seals to keep water out. In some embodiments, the closed end of the cylinder 103 allows for air to be trapped, thereby not allowing excess water to enter the cylinder. The only way for excess water to invade the cylinder is for the trapped air to escape substantially. However, the exposure to ocean water and salted water vapor could cause corrosion of metal parts. Therefore in some embodiments, the rounded cap 604 is made out of non-metallic material such as ceramic (high compressive strength and very low friction). In some embodiments, the method of forming a hole in ceramic parts is by drilling into said ceramic part using a drill bit that comprises one or more diamonds. In some embodiments, the spring 600 is coated with plastic and/or rubber. In some embodiments, the magnet 602 is coated with non metallic material. In some embodiments, the spring 600 is enclosed in a water tight deformable enclosure (not pictured). In some embodiment, said watertight enclosure is a cylinder that comprises cross-sections that alternate between a smaller diameter and a larger diameter, similar to an accordion tube. In some embodiments, between said watertight enclosure and the spring 600 is a rubber enclosure that prevents parts of the accordion-like tube from getting jammed between the loops of said spring 600. In some embodiments, the linear generator embodiments of FIG. 5 and FIG. 13 can be momentarily powered (instead of use as a generator) to control the position of piston or the forces on the piston 203. This can allow for the linear generator to exhibit negative stiffness spring tendencies to improve wave energy capture. In some embodiments, said electrical imparting of forces onto the piston can be carried out by maglev technology. In some embodiments, the cylinder 103 comprises a negative stiffness spring, wherein said spring can be at least one of magnetic, hydraulic, mechanical and pneumatic.

Figure 14:
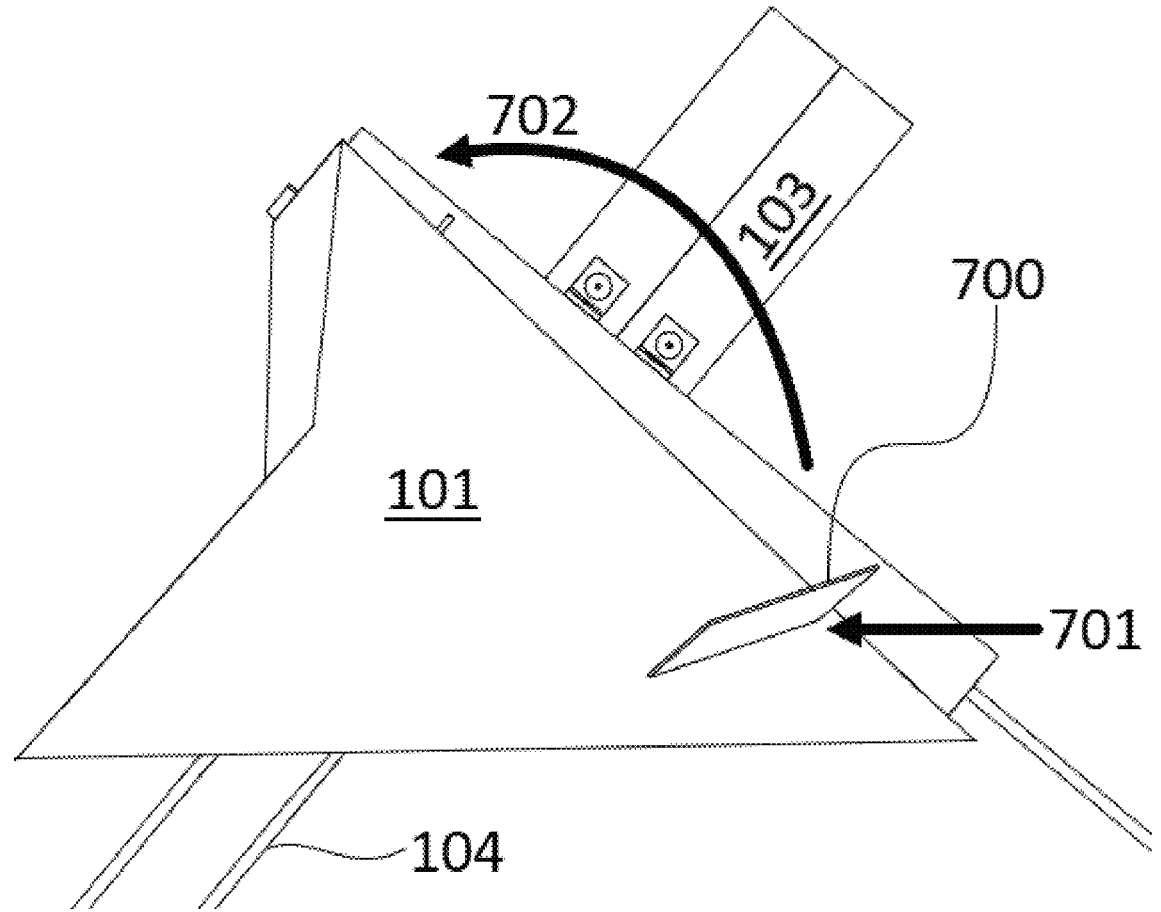
FIG. 14 shows another embodiment of the present invention that is related to the embodiments shown in FIG. 1-FIG. 4 from a side view, wherein fins are provided to cause desired pitching during different stages of the wave.

Now looking at FIG. 14, a related embodiment of the MantaWave FIG. 1-4, is shown, wherein a fin 700 is provided on each wing 101 and 102. Around the trough of a wave (towards the end of the wave), the flow of water 701 is reverse of that of the peak of the wave, and during said trough, the flow of water 701 will impart an upward force on the fin 700, thereby causing the wave energy converter to pitch down 702. This pitch down 702 reduces the effectivity of the recess, thereby reducing drag and/or added mass coefficient for an easier return of the wave energy converter to an equilibrium position after it encounters a wave.

Figure 15:
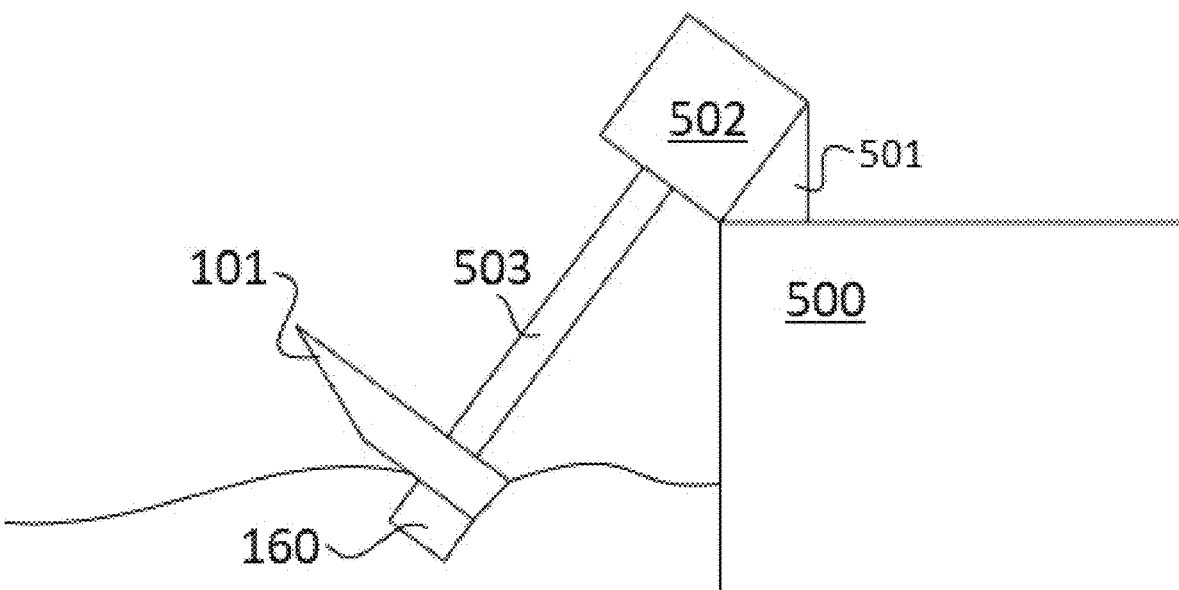
FIG. 15 shows a side view of another embodiment of the present invention, wherein a buoy 101 that response to water waves is coupled to a power takeoff system 502 via a connection member 503, in addition a recessed object 160 is provided to provide a suction force.
Figure 16:
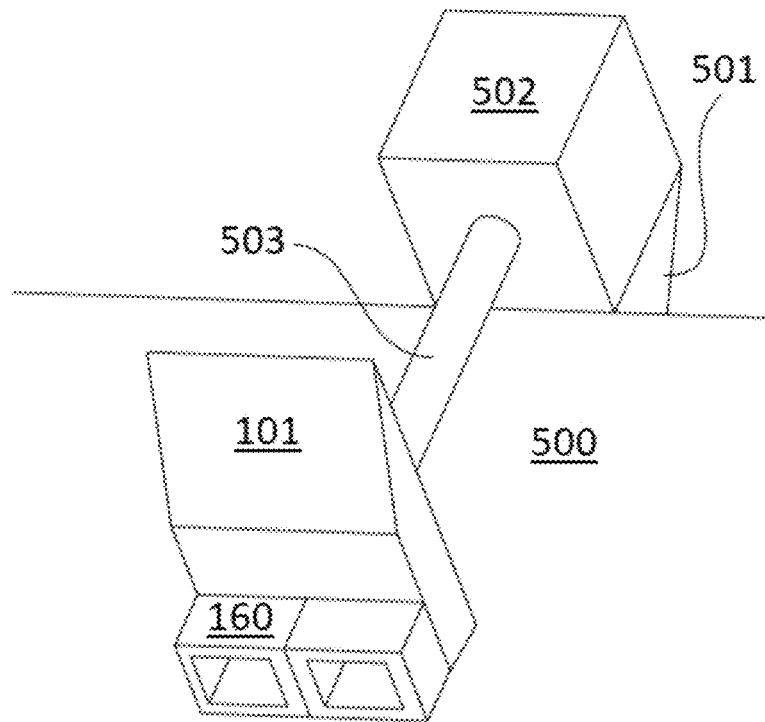
FIG. 16 shows a front perspective view of the embodiment described in FIG. 15.

In fluid mechanics, added mass is the inertia added to a system because an accelerating or decelerating body must move some volume of surrounding fluid as it moves. FIG. 15 shows an embodiment of the present invention, wherein a buoyant body 101 is responsive to water, 107, wave motion. The motion of the buoyant body 101 is transmitted to a power takeoff system 502, at least in part, via a connection member 503. The wave energy device is affixed to a platform 500 of significantly higher inertia than the wave energy device via a mounting mechanism 501. A component 160 comprises an at least partially upward recess. This is seen in FIG. 16. In some embodiments, a partially upward recess is an indentation in a physical object that comprises a com-

Figure 17:
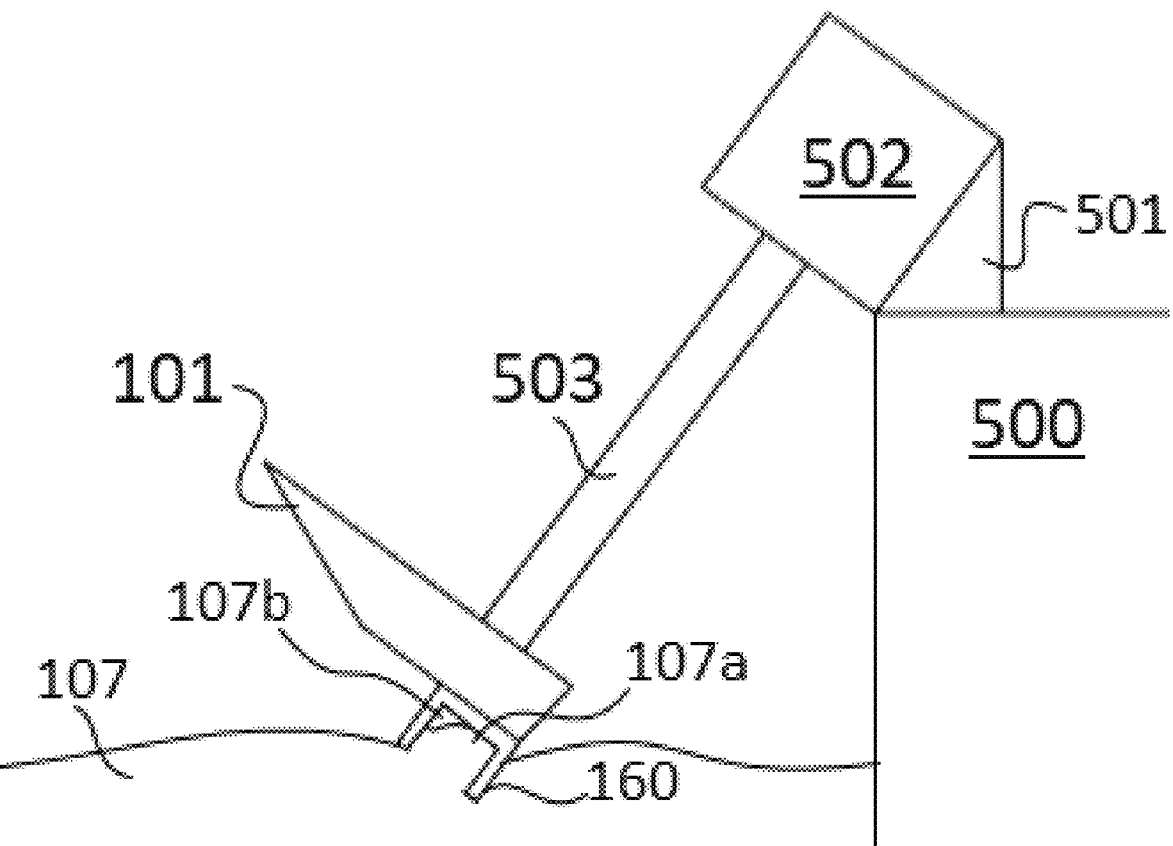
FIG. 17 shows another side view of the embodiment described in FIG. 15, with retained water 107*a* due to suction forces depicted.

10 ponent (vector) that is upward. So a slanted recess will have a partial upward recess. This recess-comprising component 106, unlike the recess formed in the FIG. 1-FIG. 4, allows for the buoyant body 101 to comprise a suction force that retains water during the receding of the water line at the trough of a wave. This means that the effective added mass of the buoyant body 101 during its upward motion is lower than the effective added mass (thus added weight) during the body's 101 downward motion. This improves overall motion. In some embodiments, the recess can be closed as desired. FIG. 17 shows the recessed object 160 retaining water 107a even though the regional surface of the regional water 107 has dropped as a result of being the wave trough. This retained water 107a is due to a natural suction force (similar to inserting a straw in water, closing the top, then pulling the straw out: you would retain water). This retained water becomes part of the overall effective weight of the oscillating body of the wave energy converter. In the preferred embodiment, this recess essentially allows the buoy and the oscillating portion of the wave energy converter to be made very light and/or the generator to be made more powerful because the system naturally adds mass using the surrounding water to be able to return the float 101 quickly enough to encounter the next wave.

Looking again at FIG. 17, some air 107b may get trapped in the recess object 160. This trapped air is usually unwanted, and may occur when air is allowed to enter the recess. In some embodiments, a mechanism is provided to remove said unwanted trapped air. Said mechanism can be a pump and/or a gas-only permitting valve.

The terminology used in this paper is for the purpose of describing particular embodiments only and is not intended to be limiting of the invention. As used in this paper, the term "and/or" includes any one or any combinations of one or more of the associated listed items. As used in this paper, the singular forms "a," "an," and "the" are intended to include the plural forms as well as the singular forms, unless the context clearly indicates otherwise. In some embodiments, a buoyant body is a body that experiences buoyancy. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. In some embodiments, a recess means an indentation, caved in, hollowed out and/or rounded inward. Any spring mentioned in this paper can be any of a magnetic, pneumatic, hydraulic and mechanical spring.

I claim:

1. A system for converting kinetic energy from water body waves to usable energy, the system comprising:
    a first buoyant body;
    a second buoyant body;
    wherein at least the first buoyant body and the second buoyant body in combination form a recess;
    wherein at least one of said first buoyant body and the second buoyant body is configured to harness kinetic energy from water waves;
    wherein a plane of best fit of the first buoyant body and a plane of best fit of the second buoyant body are non-parallel to each other when a force of a water wave does not exceed a threshold value;
    wherein when the force of a water wave imparted onto the system exceeds said threshold value, the first buoyant body and the second buoyant body move relative to each other such that the plane of best fit of the first buoyant body and the plane of best fit of the second buoyant body become closer to parallel with each other compared to their orientation when the force of a water wave imparted onto the system did not exceed said threshold value; and wherein the plane of best fit of the first buoyant body is a virtual plane that minimizes the sum of the squared orthogonal distances between itself and all the points representing the geometry of the first buoyant body; and wherein the plane of best fit of the second buoyant body is a virtual plane that minimizes the sum of the squared orthogonal distances between itself and all the points representing the geometry of the second buoyant body.

2. The system according to claim 1, wherein a movement that causes the first buoyant body and second buoyant body to become more parallel to each other, and a corresponding reverse motion, are not primary motions that are converted to usable energy.

3. The system according to claim 1, wherein the plane of best fit of the first buoyant body is neither parallel to a horizontal plane nor perpendicular to said horizontal plane.

4. The system according to claim 1, further comprising at least one spring mechanism that, at least in part, forms a connection between the first buoyant body with the second buoyant body, with said at least one spring mechanism being at least one of a magnetic spring, hydraulic spring, mechanical spring and pneumatic spring; and wherein when said force, from a wave, that exceeds said threshold value reduces to below said threshold value, said at least one spring mechanism causes the first buoyant body and second buoyant body to move relative to each other such that the plane of best fit of the first buoyant body and the plane of best fit of the second buoyant body become further from parallel with each other.

5. The system according to claim 1, wherein the first buoyant body is characterized by having a greater volume in an upper half of said first buoyant body than in a lower half of said first buoyant body, when oriented in its normal operational position.

6. The system according to claim 1, wherein the second buoyant body is characterized by having a greater volume in an upper half of said second buoyant body than in a lower half of said second buoyant body, when oriented in its normal operational position.

7. The system according to claim 1, further comprising two or more cylinders that crisscross each other;

wherein at least one of said cylinders comprises at least one of a linear generator, pump that drives a turbine, pump for desalination, pump for mineral extraction and pump for uranium extraction;

wherein said at least one of said cylinders is tethered with a body of significantly higher inertia than said system for converting kinetic energy from water body waves to usable energy; and wherein the motion of said at least one of said cylinders relative to said body of significantly higher inertia is, at least in part, converted to usable energy.

8. The system according to claim 7, wherein at least one of said cylinders is able to rotate relative to the first buoyant body and second buoyant body.

9. The system according to claim 8, wherein at least one of said cylinders is able to rotate relative to another one of said cylinders.

10. The system according to claim 8, wherein at least some of said cylinders are outside the first and second buoyant bodies.

11. The system according to claim 7, further comprising crisscrossing springs that are comprised within said two or more cylinders, wherein the springs are at least one of a magnetic spring, hydraulic spring, mechanical spring and pneumatic spring.

12. The system according to claim 11, wherein at least some of said crisscrossing springs are outside the first and second buoyant bodies.

13. The system according to claim 1, wherein the extent of capitulation of the recess corresponds to the force of a water wave.

14. The system according to claim 1, wherein any of the first buoyant body and the second buoyant body comprises a fin that is responsive to the regional water flow during a trough of a wave, in a manner so as to pitch the system to reduce at least one of the system's drag coefficient, and the system's added mass coefficient, when compared to those of the system during the peak of the wave.

15. The system according to claim 1, wherein the first buoyant body (101) comprises fundamental planes (FIG. 10; 401.*xy*, 401.*zx*, 401.*yz*) that are three mutually perpendicular imaginary planes, and wherein one of said fundamental planes of the first buoyant body is coplanar with the plane of best fit of the first buoyant body;

the second buoyant body (102) comprises fundamental planes (FIG. 10; 402.*xy*, 402.*zx*, 402.*yz*) that are three mutually perpendicular imaginary planes, and wherein one of said fundamental planes of the second buoyant body is coplanar with the plane of best fit of the second buoyant body; and the first buoyant body (101) and the second buoyant body (102) are configured in a manner such that each of the fundamental planes (FIG. 10; 401.*xy*, 401.*zx*, 401.*yz*) of the first buoyant body (101) intersect, to form a unique line, with each of the fundamental planes (FIG. 10; 402.*xy*, 402.*zx*, 402.*yz*) of the second buoyant body (102), when the fundamental planes of the first buoyant body and the fundamental planes of the second buoyant body are extended infinitely.

16. A method for converting kinetic energy from water body waves to usable energy, the method comprising:

providing a first buoyant body;

providing a second buoyant body;

arranging at least the first buoyant body and the second buoyant body in combination to form a recess;

wherein at least one of said first buoyant body and the second buoyant body is configured to harness kinetic energy from water waves;

positioning the first buoyant body and the second buoyant body such that a plane of best fit of the first buoyant body and a plane of best fit of the second buoyant body are non-parallel to each other when a force of a water wave does not exceed a threshold value;

allowing the first buoyant body and the second buoyant body to move relative to each other, when the force of a water wave exceeds said threshold value, such that the plane of best fit of the first buoyant body and the plane of best fit of the second buoyant body become closer to parallel with each other compared to their orientation when the force of a water wave imparted does not exceed said threshold value;

wherein the plane of best fit of the first buoyant body is a virtual plane that minimizes the sum of the squared orthogonal distances between itself and all the points representing the geometry of the first buoyant body; and wherein the plane of best fit of the second buoyant body is a virtual plane that minimizes the sum of the squared orthogonal distances between itself and all the points representing the geometry of the second buoyant body.

17. The method according to claim 16, further comprising the step of arranging the first buoyant body such that the plane of best fit of the first buoyant body is neither parallel to a horizontal plane nor perpendicular to said horizontal plane.

18. The method according to claim 16, further comprising a step of connecting the first buoyant body with the second buoyant body via at least one spring mechanism, with said at least one spring mechanism being at least one of a magnetic spring, hydraulic spring, mechanical spring and pneumatic spring; and allowing said at least one spring mechanism to move the first buoyant body and second buoyant body relative to each other such that the plane of best fit of the first buoyant body and the plane of best fit of the second buoyant body become further from parallel with each other, when said force from a wave, that exceeds said threshold value, reduces to below said threshold value.

\* \* \* \* \*